United States Patent
Kim et al.

(10) Patent No.: US 10,276,876 B2
(45) Date of Patent: Apr. 30, 2019

(54) METHOD OF PREPARING MINUTE CARBONIZED CELLULOSE AND METHOD OF PREPARING CATALYST SUPPORT USING THE SAME

(71) Applicant: KOREA INSTITUE OF ENERGY RESEARCH, Daejeon (KR)

(72) Inventors: Hee-yeon Kim, Daejeon (KR); Seong Ok Han, Daejeon (KR); In-sub Han, Chungcheongnam-do (KR); Se-young Kim, Daejeon (KR); Young-hoon Seong, Daejeon (KR); Doo-won Seo, Daejeon (KR); Guk Hyeon Kwon, Gyeongsangbuk-do (KR)

(73) Assignee: Korea Institute of Energy Research, Daejeon (KR)

( * ) Notice: Subject to any disclaimer, the term of this patent is extended or adjusted under 35 U.S.C. 154(b) by 309 days.

(21) Appl. No.: 15/285,043

(22) Filed: Oct. 4, 2016

(65) Prior Publication Data

US 2017/0098827 A1 Apr. 6, 2017

(30) Foreign Application Priority Data

Oct. 5, 2015 (KR) .................. 10-2015-0139671

(51) Int. Cl.
| | |
|---|---|
| *C01B 31/02* | (2006.01) |
| *H01M 4/88* | (2006.01) |
| *C10B 53/02* | (2006.01) |
| *C10B 57/00* | (2006.01) |
| *C10B 57/10* | (2006.01) |
| *H01M 4/92* | (2006.01) |
| *H01M 4/90* | (2006.01) |
| *C01B 32/15* | (2017.01) |

(52) U.S. Cl.
CPC ........... *H01M 4/8803* (2013.01); *C01B 32/15* (2017.08); *C10B 53/02* (2013.01); *C10B 57/005* (2013.01); *C10B 57/10* (2013.01); *H01M 4/9083* (2013.01); *H01M 4/926* (2013.01); *Y02E 50/14* (2013.01)

(58) Field of Classification Search
CPC ...................................... C01B 32/15
See application file for complete search history.

(56) References Cited

U.S. PATENT DOCUMENTS 10,006,166 B2 * 6/2018 Zhu .................. D21B 1/021

FOREIGN PATENT DOCUMENTS

| | | |
|---|---|---|
| JP | 2008034557 A | 2/2008 |
| JP | 2008082535 A | 4/2008 |
| KR | 100878751 B1 | 1/2009 |
| KR | 101534298 B1 | 6/2015 |
| KR | 101480544 B1 | 8/2015 |

OTHER PUBLICATIONS

Jenny Hilding et al, "Dispersion of Carbon Nanotubes in Liquids", Journal of Dispersion Science and Technology, vol. 24, No. 1, pp. 1-41 (2003).
Research Report, "Development of Organic—Inorganic Nano Hybrid Biocomposites", Carbon dioxide Reduction and Sequestration R&D, (Mar. 2012).

* cited by examiner

*Primary Examiner* — Stuart L Hendrickson
(74) *Attorney, Agent, or Firm* — Amanda M. Prose; Westman, Champlin & Koehler, P.A.

(57) ABSTRACT

Disclosed is a method of manufacturing carbonized fine cellulose, which enables the formation of carbonized nano-sized cellulose by subjecting cellulose to drying, carbonization, and pulverization by means of shock waves using ultrasonic waves and microbubbles, thus realizing mass producibility, making it possible to fabricate a carbonized nano-sized material having uniform quality, and reducing the manufacturing costs. The carbonized fine cellulose is in the form of a nano-sized uniform carbon powder, and can thus be utilized as a catalyst support in various forms, such as fuel cell electrodes, electrodes of energy storage devices such as supercapacitors or secondary batteries, catalyst supports for micro-nano hybrid reactors, etc.

8 Claims, 8 Drawing Sheets

METHOD OF PREPARING MINUTE CARBONIZED CELLULOSE AND METHOD OF PREPARING CATALYST SUPPORT USING THE SAME

CROSS-REFERENCE TO RELATED APPLICATION

This application claims the priority benefit of Korean Patent Application No. 10-2015-0139671, filed on Oct. 5, 2015 in the Korean Intellectual Property Office, the disclosure of which is incorporated herein by reference.

BACKGROUND OF THE INVENTION

1. Technical Field

The present invention relates to a method of manufacturing carbonized fine cellulose and, more particularly, to a method of manufacturing carbonized nano-sized cellulose by carbonizing and pulverizing cellulose.

2. Description of the Related Art

Recently, thorough research into biomaterials such as algae or natural forestry resources is ongoing. Furthermore, attempts are being made to utilize such biomaterials as advanced new-material technology combined with nano-technology (NT), energy technology and environmental technology (ET).

As for biomaterials, there are exemplary techniques associated with bio-ethanol synthesis and polymer/natural fiber composites using cellulose components of corn or algae.

In order to improve mechanical, physical, and electrical properties of biomaterials, nano-scale cellulose nanofibers are currently being manufactured, and the use thereof as composite materials is under study.

Techniques using natural cellulose may be applied to energy electrodes, battery materials, harmful material adsorbents, and reactive materials for hydrogen production, in addition to biomass and composites.

In particular, a catalyst for use in manufacturing fuel cells includes platinum alone or an alloy of platinum and ruthenium, undesirably increasing manufacturing costs. Hence, research into reducing the catalyst costs by maximizing the catalytic activity of a limited amount of platinum is being carried out. Furthermore, in order to decrease the amount of catalyst that is used and to increase the activity of a noble metal platinum catalyst by maximizing the active area of the carrier on which a noble metal platinum catalyst may be loaded, attempts are being made to use a nano carbon carrier in various forms, such as carbon nanotubes or carbon nanorods.

However, carbon nanotubes and carbon nanorods have many limitations in terms of use as a catalyst support because of difficulty in mass production and high manufacturing costs.

SUMMARY OF THE INVENTION

Accordingly, the present invention has been made keeping in mind the problems encountered in the related art, and the present invention is intended to provide a method of manufacturing carbonized fine cellulose, in which cellulose is carbonized and then pulverized to a nano size.

In addition, the present invention is intended to provide carbonized fine cellulose manufactured through the above method and a catalyst support using the same.

In addition, the present invention is intended to provide a cellulose support-loaded catalyst and a method of manufacturing the same, in which the catalyst is configured such that a metal nano-catalyst is loaded on the catalyst support including the carbonized cellulose.

The above and other features and advantages of the present invention will be more clearly understood from the following detailed description and claims taken in conjunction with the accompanying drawings.

A method of manufacturing carbonized fine cellulose according to the present invention comprises the steps of, as shown in FIG. 1, preparing a cellulose sample (S10), drying the cellulose sample (S20), carbonizing the dried cellulose sample to form carbonized cellulose (S30), mixing the carbonized cellulose with a fluid (S40), and applying shock waves using microbubbles and ultrasonic waves to the carbonized cellulose-mixed fluid to pulverize the carbonized cellulose, thereby forming carbonized nano-sized cellulose (S50).

In addition, a method of manufacturing carbonized fine cellulose according to the present invention comprises the steps of, as shown in FIG. 2, preparing a cellulose sample (S10), drying the cellulose sample (S20), carbonizing the dried cellulose sample to form carbonized cellulose (S30), mixing the carbonized cellulose with a fluid (S40), applying shock waves using microbubbles and ultrasonic waves to the carbonized cellulose-mixed fluid to pulverize the carbonized cellulose, thereby forming carbonized nano-sized cellulose (S50), and loading a metal nano-catalyst on the surface of the carbonized nano-sized cellulose (S60). Through the above processes, a cellulose support-loaded catalyst may be manufactured.

In addition, a method of manufacturing carbonized fine cellulose according to the present invention comprises the steps of, as shown in FIG. 3, preparing a cellulose sample (S10), drying the cellulose sample (S20), carbonizing the dried cellulose sample to form carbonized cellulose (S30), mixing the carbonized cellulose with a fluid (S40), applying shock waves using microbubbles and ultrasonic waves to the carbonized cellulose-mixed fluid to pulverize the carbonized cellulose, thereby forming carbonized nano-sized cellulose (S50), inserting the carbonized nano-sized cellulose into the microchannels in carbonized cellulose fibers having a microchannel structure, thus forming a micro-nano catalyst support (S70), and loading a metal nano-catalyst on the micro-nano catalyst support (S80). Through the above processes, a micro-nano hybrid reactor may be manufactured using the carbonized fine cellulose.

Below is a detailed description of the steps of the method of manufacturing the carbonized fine cellulose according to the present invention.

S10 is the step of preparing the cellulose sample. The kind of cellulose used in the present invention is not particularly limited. In a preferred embodiment of the present invention, the cellulose sample may be vegetable cellulose, such as one derived from cotton, hemp, flax, jute, kenaf, henequen, *Setaria viridis*, acacia, pine, *Ceramium kondoi, laver, Gelidium amansii, Pterocladiella capillacea, Acanthopeltis* sp., *Gracilaria verrucosa, Hypnea charoides, Ceramium boydenii, Gigartina tenella, Campylaephora hypnaeoides, Grateloupia filicina*, etc., or animal cellulose, such as wool and silk. Also, the cellulose sample of the present invention may be gel-type cellulose, but the present invention is not necessarily limited thereto.

Furthermore, the cellulose sample of the present invention may be obtained from a variety of agricultural or forestry products, and may be bacterial cellulose or waste cellulose generated during paper-making or mintage processes.

The cellulose sample may be provided in the form of a powder, a plate obtained by primarily processing a cellulose powder, or a gel.

The gel-type cellulose sample is viscous due to water contained therein, and may be used after primary grinding to a length ranging from ones of μm to ones of mm using a mixer with a cutter.

S20 is the step of drying the cellulose sample. Drying the cellulose sample may be performed using hot-air drying, ambient drying, low-temperature vacuum drying, lyophilization, etc. The powder- or plate-type cellulose sample is preferably dried in a drying chamber at a temperature of 100 to 120° C., and more preferably 110° C. for about 10 to 12 hr, thereby removing water therefrom. Also, the gel-type cellulose is preferably dried through lyophilization, whereby only water is selectively removed while the inner microfibrous matrix is maintained. The water contained in the gel-type cellulose is frozen through lyophilization and then removed through sublimation. The cellulose sample thus dried is able to maintain a fine fibrous structure having a microfibril network or fine short fibers, and may thus be more efficiently formed into a sheet-like carbon material in fine fiber form having a microfibril network or fine short fibers through the subsequent carbonization process, and furthermore, may be made finer in the subsequent pulverization process, thereby facilitating the formation of the carbonized nano-sized cellulose.

In the step of drying the cellulose through lyophilization, the ground gel-type cellulose sample is added into liquid nitrogen in a vacuum. The lyophilization time may be adjusted within the appropriate range depending on the amount of the gel-type cellulose and the water content in the cellulose.

Thereafter, the dried cellulose sample is subjected to the carbonization step (S30). The dried cellulose sample is carbonized in an inert gas atmosphere, thereby producing a fine fiber- or thin sheet-type carbon material. The inert gas may include nitrogen, argon, helium, etc., which are typically used in the carbonization process. The inner temperature of a carbonization furnace falls in the range of 500 to 1500° C., and preferably 500 to 700° C.

The step of carbonizing the cellulose is performed in a manner in which the dried cellulose sample is placed in a carbonization furnace and inert gas is allowed to flow for 30 min to remove impurities from the carbonization furnace, thus forming an inert atmosphere, after which the cellulose sample is heated to a temperature of 500 to 1,500° C. at a rate of 5 to 20° C./min and then maintained at 500 to 1,500° C. for 0.5 to 4 hr, thereby yielding carbonized cellulose. In this procedure, impurities are removed from the cellulose fibers, thus decreasing the wall thickness of fibers, and spaces where impurities such as wax or fat components have been present are maintained in the form of inner pores.

In another embodiment of the present invention, carbonization may be carried out through two stages, namely primary carbonization (S31) at 500 to 700° C. in an inert gas atmosphere and secondary carbonization (S32) at a high temperature of 700 to 2,000° C. When two-stage carbonization is performed in this way, impurities are removed from the carbonized cellulose and also the conductivity or crystallinity of the carbonized cellulose may be significantly improved.

In an embodiment of the present invention, the carbonized cellulose may be provided in the form of a thin sheet having a length ranging from ones of μm to tens of μm and a thickness ranging from ones of nm to tens of nm. Such ultrathin carbonized cellulose is maintained in a structure composed of fine fibers having a size ranging from ones of nm to hundreds of nm therein, thus ensuring a considerably large surface area. Hence, it may be utilized as a filter, an adsorbent, a catalyst carrier, and an electrode material.

Furthermore, the carbonized cellulose obtained through the carbonization process is provided in the form of a flake having a nano-scale thickness, and thus, when it is applied to electrodes for fuel cells, the electrode thickness is considerably decreased, thereby remarkably reducing the size of the fuel cell. Moreover, a graphite structure is densely formed within fibers, thus ensuring high strength, whereby it may be utilized as a reinforcing agent for various composites.

The carbonized cellulose obtained through the carbonization process is subjected to mixing with a fluid (S40) before being pulverized into carbonized nano-sized cellulose. If necessary, additional physical grinding may be performed using a mixer or a mortar, before mixing in the fluid. The mixing and dispersing of the carbonized cellulose in the fluid are the pretreatment procedure for the subsequent pulverization process using microbubbles and ultrasonic waves. The kind of fluid that is used is not particularly limited, but may include acetone, acetyl glycol, isopropyl alcohol, hexane, dichloromethane, ethanol, methanol, hexadecane, dodecane, dimethyl sulfoxide, benzene, xylene, methyl chloride, chloroform, toluene, dimethyl formamide, etc.

The carbonized cellulose dispersed in the mixed fluid is processed into the carbonized nano-sized cellulose through the pulverization step (S50).

The step of pulverizing the carbonized cellulose (S50) according to the present invention may be performed using a horn-shaped ultrasonic device 1 with the bubbling unit shown in FIG. 4.

With reference to FIG. 4, the device 1 may include a pulverization chamber 10, a microbubble generator 20, and an ultrasonic generator 30. The pulverization chamber 10 may include a body 11 and a cover 12, and the cover 12 may be provided so that the microbubble generator 20 and the ultrasonic generator 30 are installed through the cover 12. As necessary, an ultrasonic generator 30 may be disposed at the center of the device, and a plurality of microbubble generators 20 may be disposed therearound. Alternatively, a microbubble generator 20 may be disposed at the center of the device, and a plurality of ultrasonic generators 30 may be disposed therearound.

The ultrasonic generator 30 is connected to an ultrasonic transducer (not shown) and thus functions to amplify ultrasonic waves generated from the ultrasonic transducer.

The microbubble generator 20 enables the inert gas 22 to be introduced into the mixed fluid 13 through a fine gas pipe, thereby forming multiple microbubbles 14 in the fluid. The inert gas 22 may be nitrogen, argon, or helium.

The end 21 of the microbubble generator 20 from which the inert gas is discharged and the tip 31 of the ultrasonic generator 30 are disposed to be immersed in the carbonized cellulose-mixed fluid 13, and the end 21 of the microbubble generator 20 is preferably positioned to be lower than the tip 31 of the ultrasonic generator 30.

In the mixed fluid 13 in the pulverization chamber 10, multiple microbubbles 14 are formed by the inert gas fed via the microbubble generator 20. In this case, ultrasonic waves generated from the ultrasonic generator 30 are applied to the fluid via the tip thereof, and ultrasonic energy is transferred to the microbubbles 14 formed in the fluid, thus generating shock waves due to the explosion of microbubbles resulting from the drastic volume expansion of the bubbles and the increase in temperature thereof.

The shock waves due to the explosion of microbubbles in the mixed fluid are applied to the carbonized cellulose present in the mixed fluid. The carbonized cellulose, having a length ranging from ones of μm to tens of μm, is pulverized into the carbonized fine cellulose having a length ranging from ones of nm to tens of nm by the applied shock waves.

In the step of pulverizing the carbonized cellulose (S50) according to the present invention, the thickness and length of the carbonized fine cellulose may be determined depending on the kind of carbonized cellulose-mixed fluid, the intensity of the ultrasonic waves generated from the ultrasonic generator, the number and positions of ultrasonic horns, and the amount of the inert gas fed via the microbubble generator 20. Thus, the above conditions are appropriately adjusted, thereby manufacturing the carbonized fine cellulose having a desired size.

The carbonized fine cellulose thus manufactured is separated from the mixed fluid (S51), washed and dried (S52), and may then be finally obtained.

In addition, the present invention addresses the use of the carbonized fine cellulose, manufactured as described above, as a catalyst support.

According to the present invention, the carbonized fine cellulose is provided in the form of a nano-sized uniform carbon powder, and may be utilized as a catalyst support in various forms, such as electrodes for fuel cells, electrodes for energy storage devices such as supercapacitors or secondary batteries, catalyst supports for micro-nano hybrid reactors, etc.

In particular, the carbonized fine cellulose manufactured according to the present invention may be employed as a catalyst support for a fuel cell. The catalyst using the carbonized fine cellulose according to the present invention may be used as an electrode for a fuel cell stack. Compared to conventional carbon black-based catalysts, the catalyst of the invention may be formed to be very thin, and is particularly useful in the fabrication of ultrathin fuel cell electrodes.

In order to manufacture a catalyst support for a fuel cell using the carbonized fine cellulose according to the present invention, the carbonized fine cellulose may be chemically treated with an acidic solution so as to substitute a functional group such as CO—, CH—, O—C═O, $CO_2$, $CO_3$ or the like on the surface of the carbonized fine cellulose.

The carbonized fine cellulose is chemically treated with an acidic solution as follows. Specifically, the carbonized fine cellulose is immersed in a 0.1 to 0.5 mol sulfuric acid aqueous solution and then treated 10 to 60 times at a sweep rate of 50 mV/s at −0.15 to 1.3 V, after which it is immersed in a 30% nitric acid solution at 100 to 150° C. (or a 14 N nitric acid solution) and maintained therein for 10 min to 20 hr, or is immersed in a mixed solution of nitric acid (14 M, 50 ml) and sulfuric acid (98%, 50 ml) or a mixed solution of 98% sulfuric acid and 70% nitric acid at a volume ratio of 3:1 and then treated for 5 min to 6 hr with refluxing at 50 to 70° C. Subsequently, the carbonized fine cellulose thus treated is sufficiently washed with distilled water, filtered, and dried at 110° C. for 12 hr, thus finally obtaining a catalyst support using the carbonized fine cellulose.

The catalyst metal is loaded on the surface of the catalyst support according to the present invention, thereby obtaining the catalyst. The metal nano-catalyst that may be loaded on the catalyst support according to the present invention may include platinum, gold, silver, nickel, cobalt, ruthenium, palladium or molybdenum. The process of loading the metal nano-catalyst is not particularly limited, and may be appropriately performed using any one selected from among chemical vapor deposition (CVD), an incipient wetness impregnation process, and impregnation.

In addition, the carbonized fine cellulose according to the present invention may be applied to a micro-nano hybrid reactor.

The micro-nano hybrid reactor of the present invention may be manufactured by inserting the carbonized fine cellulose into the microchannels in carbonized cellulose fibers having a microchannel structure.

The carbonized cellulose fibers having a microchannel structure are obtained by drying and carbonizing any one cellulose fiber selected from among henequen fibers, kenaf, abaca, bamboo, hemp, flax, China grass, pineapple, ramie, sisal, straw, barley stem, wheat stem, chaff, and acacia tree. The specific manufacturing process thereof is as follows.

Cellulose fibers having no impurities are separated into thin fibers having a thickness ranging from tens to hundreds of μm, and are then cut to short fibers having a size of 1 to 2 mm in the state of being immersed in liquid nitrogen. The cut cellulose fibers are dried, placed in a quartz tube, heated to 500 to 1500° C. at a rate of 5 to 20° C./min in a nitrogen atmosphere or a mixed gas atmosphere of nitrogen and hydrogen, and then maintained at 500 to 1,500° C. for 1 to 5 hr, thereby carbonizing the cellulose fibers.

The carbonized cellulose fibers may be ground into particles having a diameter of tens of μm and a length ranging from hundreds of μm to ones of mm using a mortar and a pestle. The carbonized cellulose fibers thus obtained are configured such that micro-sized channels are formed therein. The carbonized fine cellulose is inserted into such microchannels, and the metal catalyst material is loaded thereto, thereby forming a micro-nano hybrid reactor. The metal catalyst may be exemplified by platinum, gold, silver, nickel, cobalt, ruthenium, palladium or molybdenum.

In order to inset the carbonized fine cellulose into the microchannels in the carbonized cellulose fibers, any method may be applied without limitation. For example, as illustrated in FIG. 5, a device for manufacturing a micro-nano hybrid structure may be used to fabricate carbonized cellulose fibers into which the carbonized fine cellulose is inserted.

The device 100 for manufacturing the micro-nano hybrid structure of FIG. 5 may include a filter unit 110, having a micro filter, and a vacuum pump 120. The carbonized cellulose fibers 112 having microchannels are placed on the micro filter 111 provided in the filter unit 110, after which the carbonized fine cellulose-mixed fluid 113 is placed on the carbonized cellulose fibers 112, and the inside of the filter unit 110 is evacuated by the vacuum pump 120 disposed under the micro filter, whereby the fluid 114 is discharged through the lower end of the filter unit 110 and the microchannels in the carbonized cellulose fibers are packed with the carbonized fine cellulose of the invention, thus forming a micro-nano hybrid structure.

The cellulose-based micro-nano hybrid reactor thus manufactured may be provided with a remarkably increased surface area by inserting the carbonized nano-sized cellulose into the microchannels in the porous cellulose fibers. Accordingly, the cost of manufacturing the catalyst may be reduced, and the catalytic activity may be maximized even by the use of a small amount of catalyst during various catalyst reactions.

The method of manufacturing the carbonized fine cellulose according to the present invention enables the formation of carbonized nano-sized cellulose by subjecting cellulose to drying, carbonization, and pulverization by means of shock waves using ultrasonic waves and microbubbles, thus realizing mass producibility, making it possible to fabricate a carbonized nano-sized material having uniform quality, and reducing the manufacturing costs.

According to the present invention, the carbonized fine cellulose is in the form of a nano-sized uniform carbon powder, and may thus be utilized as a catalyst support in various forms, such as fuel cell electrodes, electrodes of energy storage devices such as supercapacitors or secondary batteries, catalyst supports for micro-nano hybrid reactors, etc.

DESCRIPTION OF SPECIFIC EMBODIMENTS

Hereinafter, a detailed description will be given of the present invention through the following examples, which are merely set forth to illustrate, but are not to be construed as limiting the scope of the present invention, as will be apparent to those skilled in the art.

Example 1

Preparation of Carbonized Fine Cellulose

1. Preparation and Drying of Cellulose Sample

Figure 6:
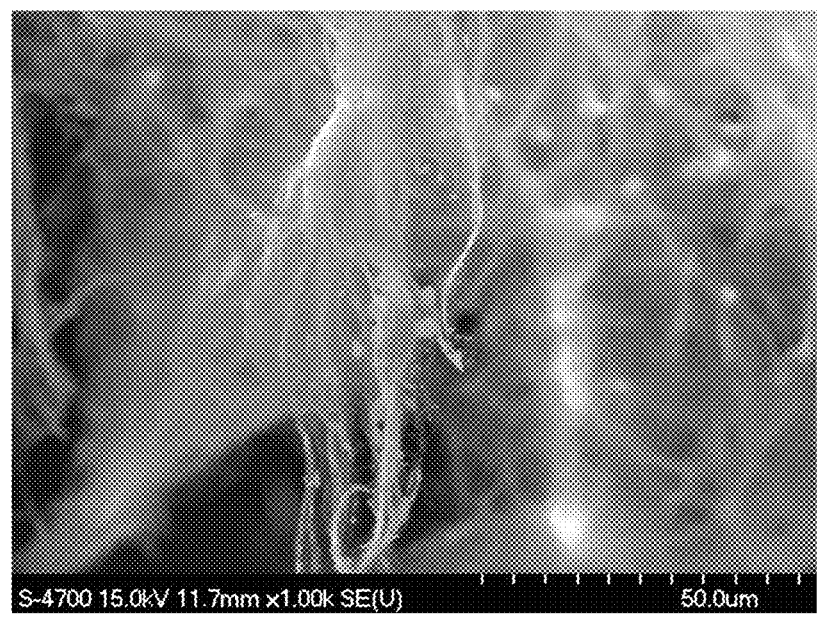
FIG. 6 shows scanning electron microscope (SEM) images of the lyophilized gel-type cellulose.
Figure 6:
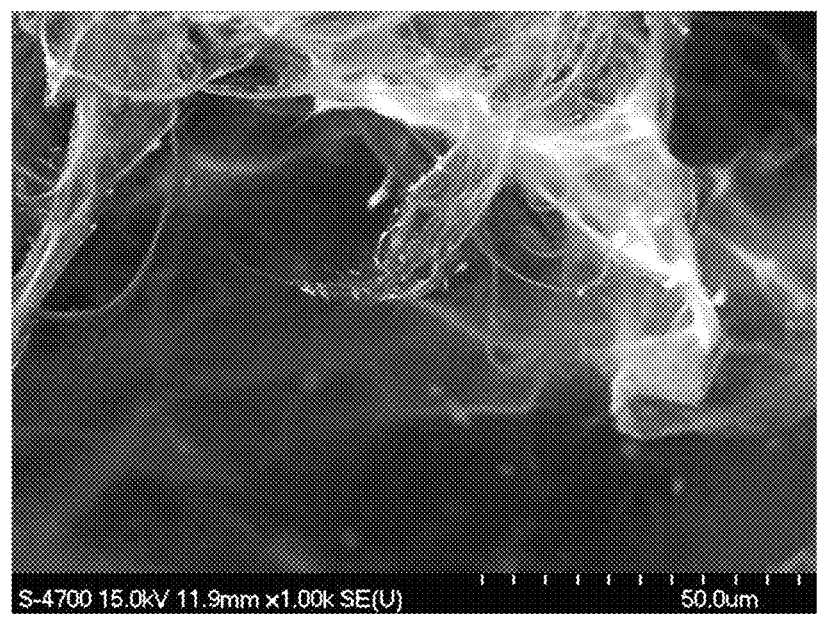

A cellulose gel produced by bacteria was uniformly ground using a mixer for 30 min. The ground cellulose sample was placed in a vacuum vessel and was then added into liquid nitrogen in a vacuum, thereby being lyophilized. The cellulose obtained through lyophilization was found to maintain the fibrous structure of cellulose alone, as shown in FIG. 6.

2. Carbonization of Dried Cellulose Sample

In order to carbonize the lyophilized cellulose sample, the dried cellulose sample was placed in a carbonization furnace. While nitrogen was allowed to flow in the carbonization furnace for 30 min, impurities were removed from the carbonization furnace and an inert atmosphere was created, after which the inner temperature of the carbonization furnace was increased from room temperature to 600° C. at a rate of 5° C./min. The cellulose sample was carbonized for about 2 hr in an inert gas atmosphere, thus manufacturing carbonized cellulose.

3. Pulverization Using Microbubbles and Ultrasonic Waves

About 0.9 g of acetone was mixed with 0.1 g of the carbonized cellulose, so that the amount of the carbonized cellulose was 10 wt % based on the total amount of the mixed fluid. The mixed fluid was placed in a mixing bath and nitrogen gas (50 sccm) was introduced into the mixed fluid using a microbubble generator, whereby nitrogen bubbles were generated in the solution. To pulverize the carbonized cellulose by exploding the nitrogen bubbles, the carbonized cellulose was treated for 30 min while the amplitude of the ultrasonic generator (500 W, 20 kHz), the tip (diameter: 3 mm) of which was immersed in the solution, was maintained at 40%, thus obtaining carbonized nano-sized cellulose.

Example 2

Formation of Catalyst Support using Carbonized Fine Cellulose

The acetone solution in which the carbonized nano-sized cellulose of Example 1 was dispersed was filtered using a filter paper, thus obtaining a carbonized nano-sized cellulose powder. The sample thus obtained was dried at room temperature for 12 hr or more, and further dried in an oven at 110° C. for 12 hr or more, thereby yielding a carbonized fine cellulose powder.

Example 3

Preparation of Loaded Catalyst using Carbonized Fine Cellulose

Figure 7:
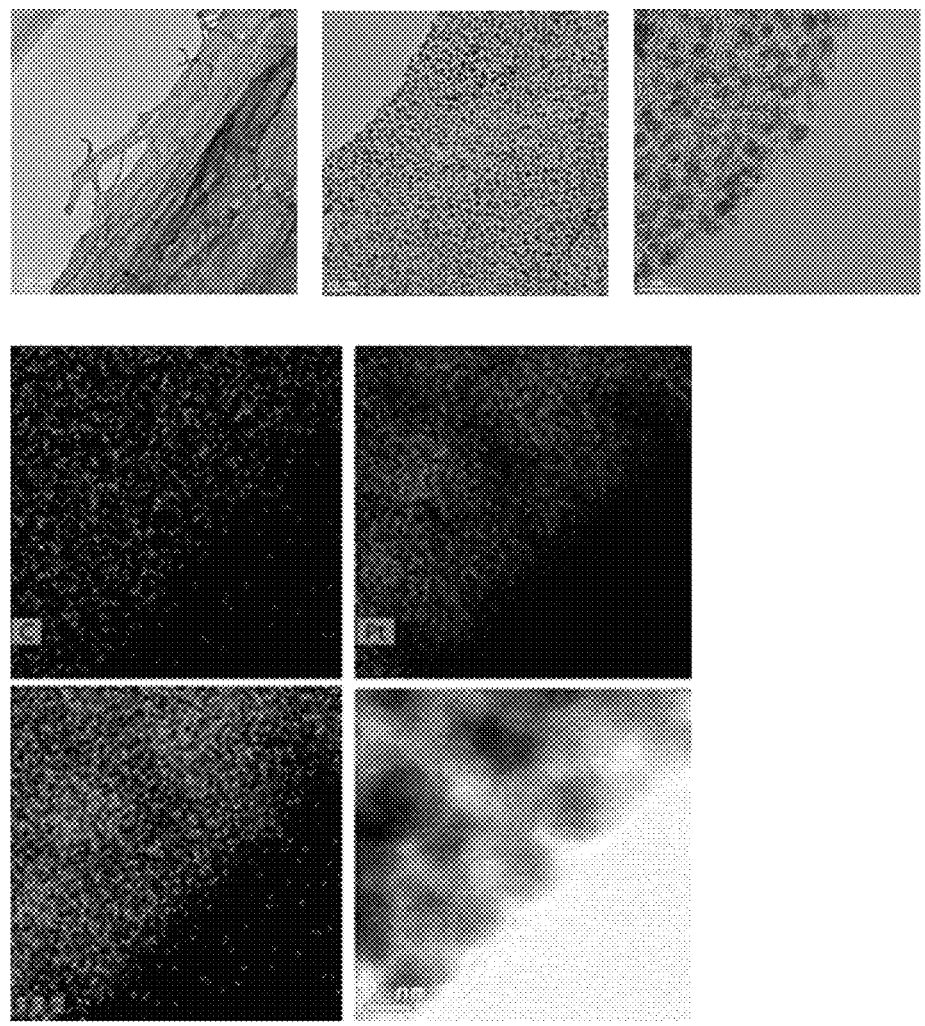
FIG. 7 shows the high-resolution transmission electron microscope (HR-TEM) images (upper) and the STEM mapping images (lower) of the cellulose support-loaded catalyst according to an embodiment of the present invention.

The carbonized fine cellulose powder of Example 2 was placed in a quartz tube and subjected to chemical vapor deposition so that platinum (Pt) nanoparticles were loaded thereon, thus synthesizing a catalyst. The TEM and STEM mapping images of the synthesized catalyst having the carbonized fine cellulose loaded thereon are shown in FIG. 7.

Example 4

Formation of Micro-Nano Hybrid Reactor Using Carbonized Fine Cellulose

Acacia branches were cut into a cylindrical shape having a diameter of ones of mm and a length of 2 to 5 mm, and dried in an oven at 110° C. in an air atmosphere for 30 hr, thus removing water therefrom. The dried acacia pieces were placed in a quartz tube and nitrogen was allowed to flow for 30 min or more, thus removing impurities from the inside of the quartz tube. The inner temperature of the quartz tube was increased to 600° C. at a rate of 5° C./min and maintained at 600° C. for 4 hr to carbonize the sample.

Figure 8:
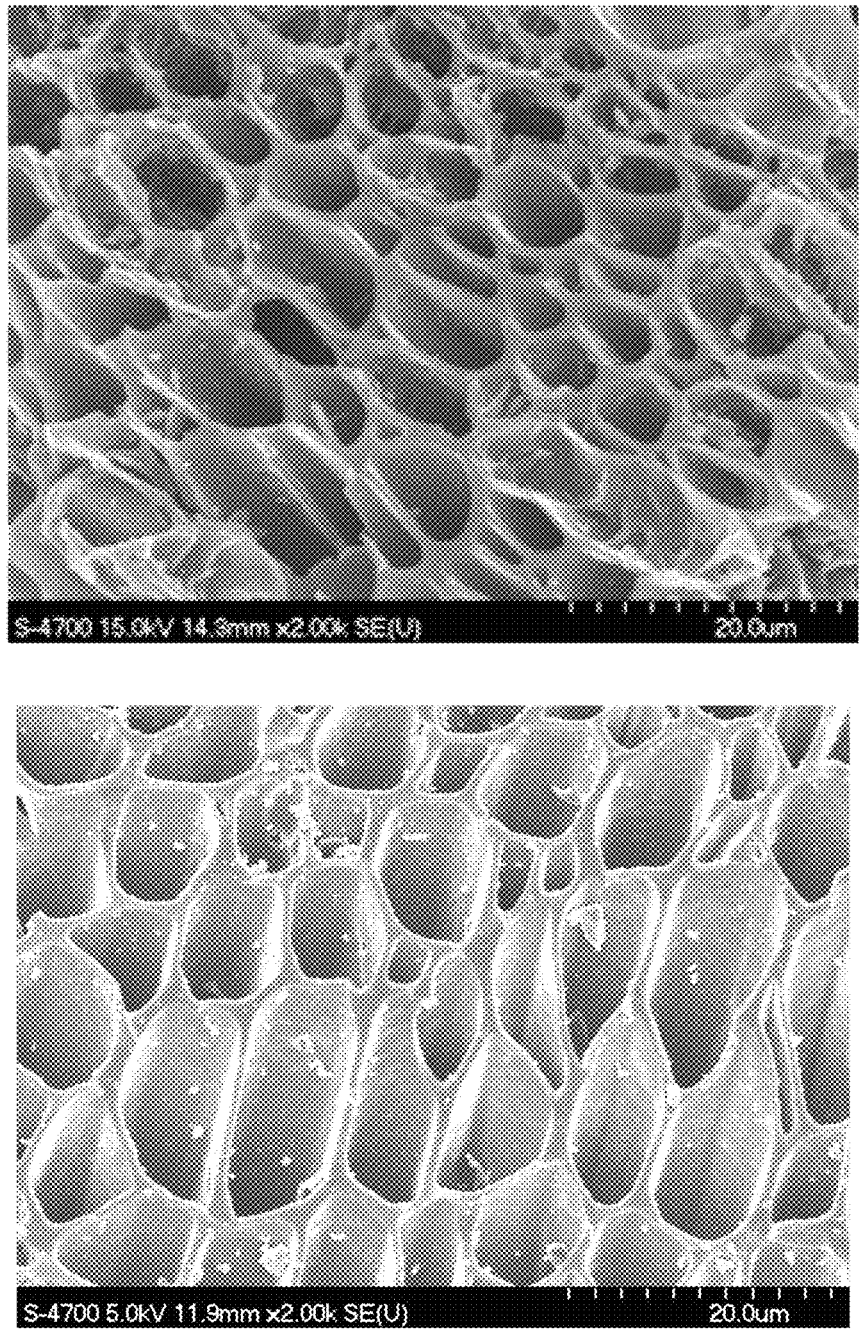
FIG. 8 shows SEM images of the carbonized cellulose fibers having a plurality of microchannels therein.

The carbonized acacia powder was ground using a mortar and a pestle, thereby obtaining carbonized acacia particles having a particle size having a diameter of tens of μm and a length ranging from hundreds of μm to ones of mm. As can be seen in the SEM images of FIG. 8, the ground carbonized acacia particles were confirmed to have microchannels therein.

Figure 1:
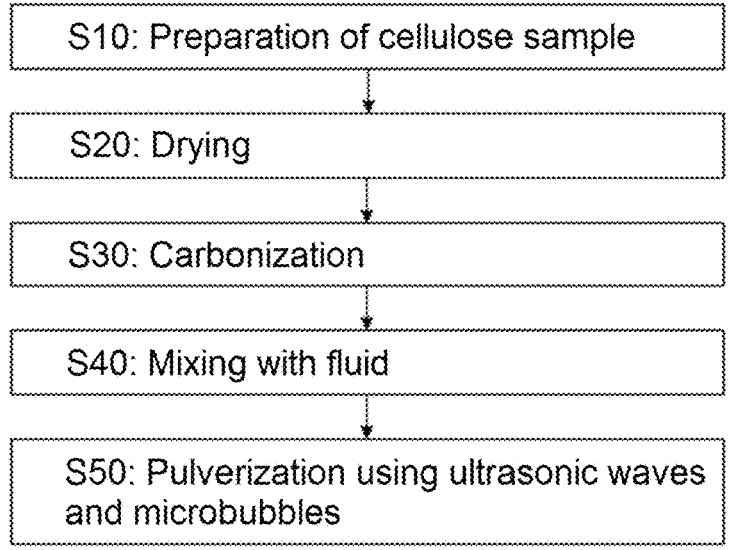
FIG. 1 is a flowchart showing a process of manufacturing carbonized fine cellulose according to the present invention.
Figure 2:
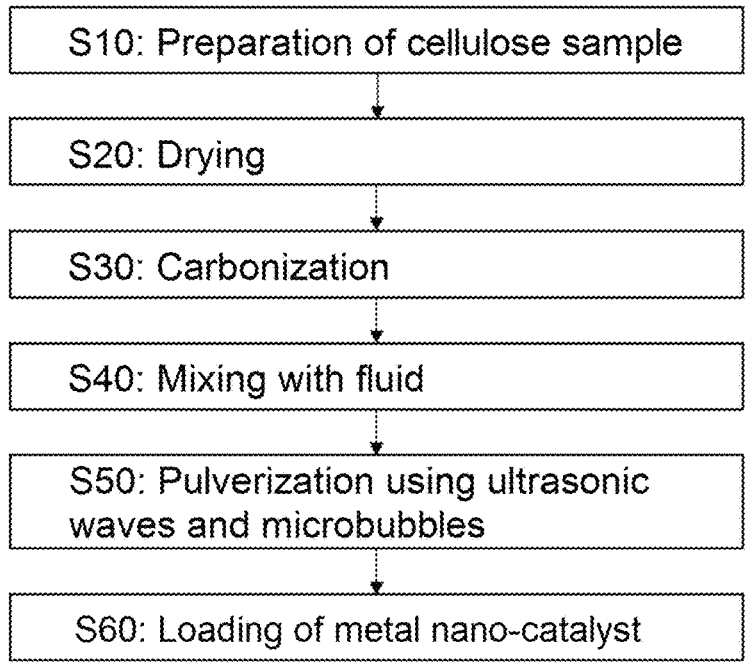
FIG. 2 is a flowchart showing a process of manufacturing a cellulose support-loaded catalyst using the process of manufacturing carbonized fine cellulose according to the present invention.
Figure 3:
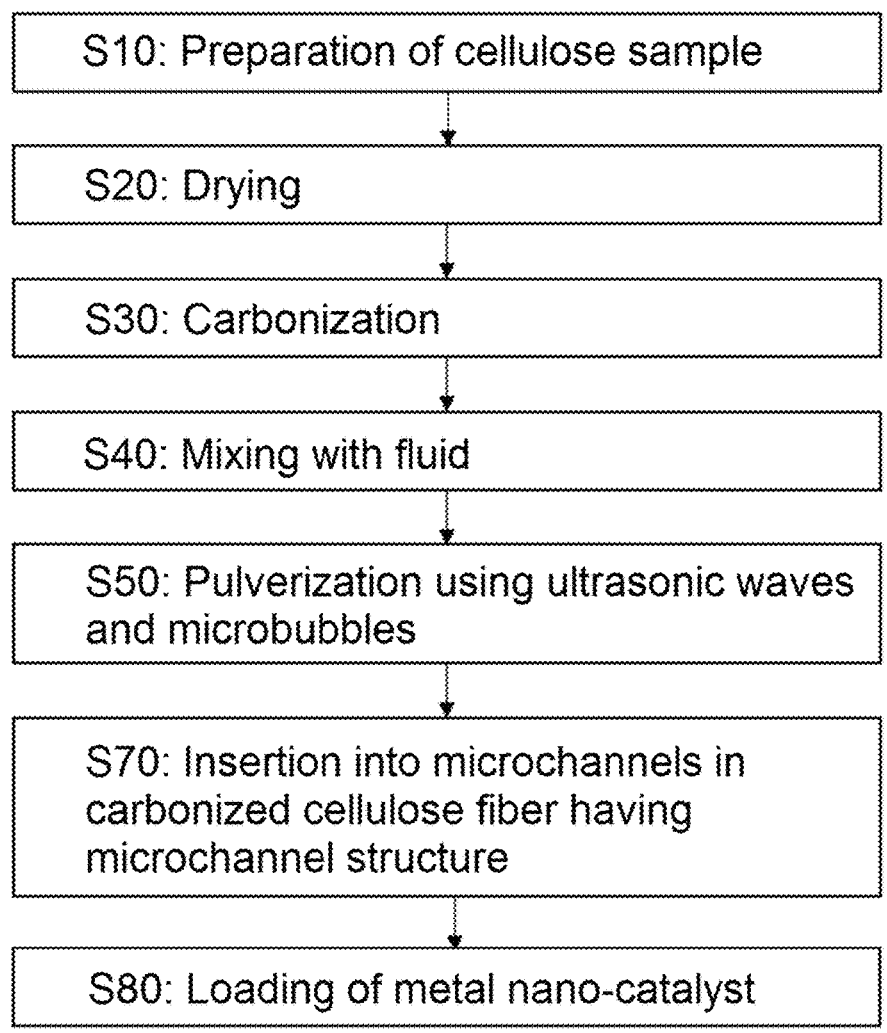
FIG. 3 is a flowchart showing a process of manufacturing a cellulose-based micro-nano hybrid reactor using the process of manufacturing carbonized fine cellulose according to the present invention.
Figure 4:
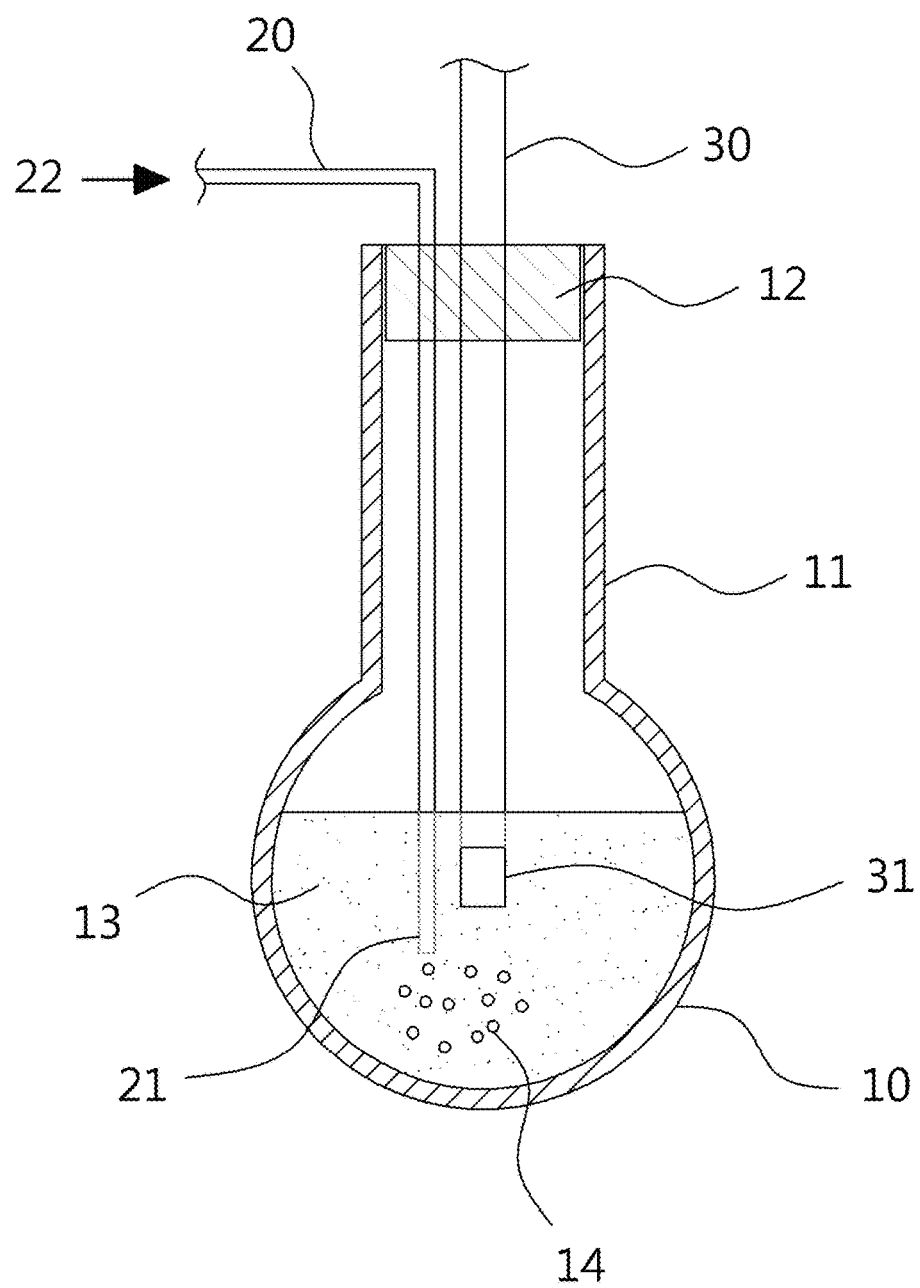
FIG. 4 is a cross-sectional view showing a horn-shaped ultrasonic device with a bubbling unit according to an embodiment of the present invention.
Figure 5:
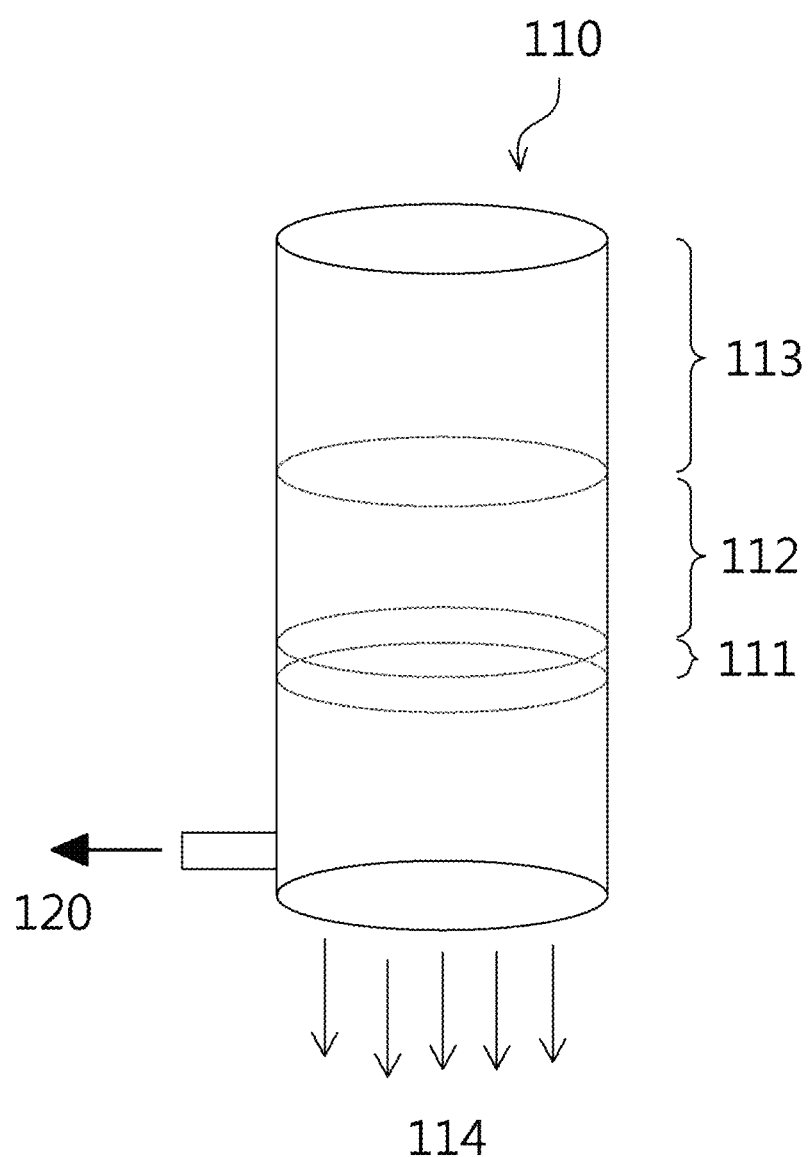
FIG. 5 is a cross-sectional view showing a device for manufacturing a micro-nano hybrid structure according to an embodiment of the present invention.
Figure 9:
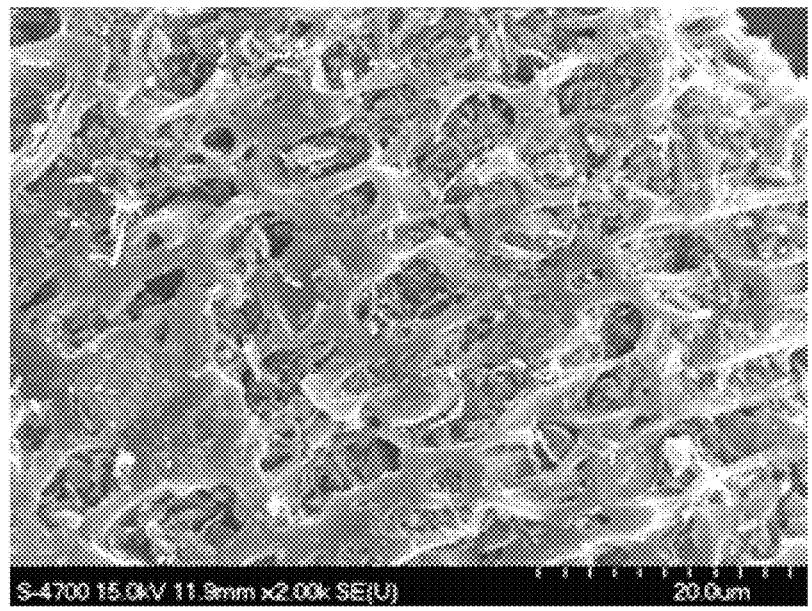
FIG. 9 shows SEM images of the micro-nano hybrid reactor according to an embodiment of the present invention.
Figure 9:
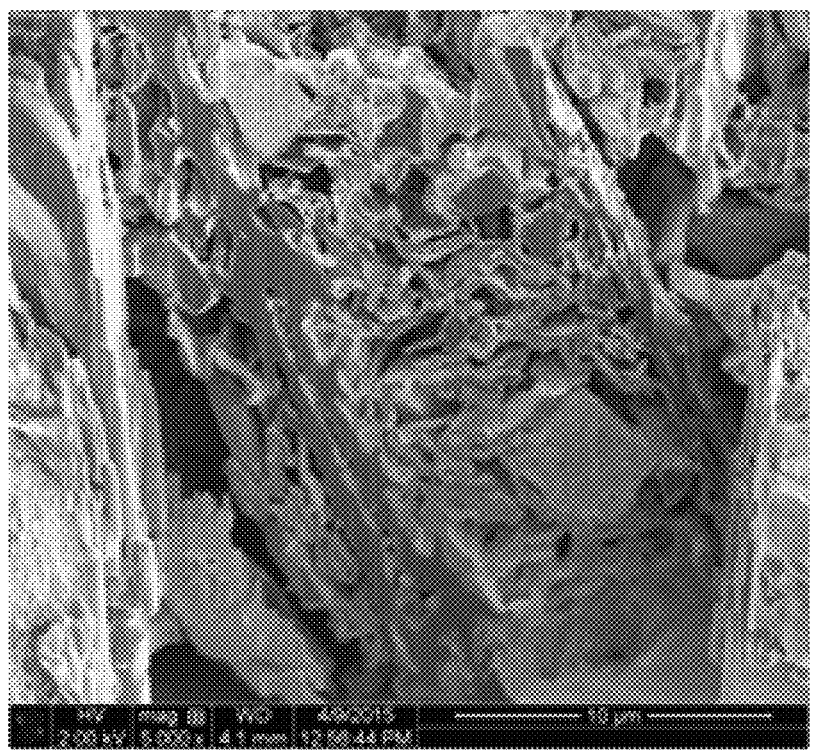

To form the hybrid structure of the carbonized acacia particles having microchannels therein and the carbonized fine cellulose of Example 1, a device for manufacturing the micro-nano hybrid structure shown in FIG. 5 was used. The carbonized acacia particles having microchannels were placed on the micro filter of the device, and then the mixed solution of acetone and carbonized fine cellulose of Example 1 was placed on the carbonized acacia particles. Thereafter, while the inside of the device was evacuated using a vacuum pump disposed under the filter, the microchannel structure of the carbonized acacia particles was packed with the carbonized fine cellulose. The SEM images of the manufactured micro-nano hybrid reactor are illustrated in FIG. 9.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should be interpreted not by specific embodiments but by the accompanying claims, and it is to be understood that all technical ideas within the claims fall within the purview of the present invention.

What is claimed is:

1. A method of manufacturing a carbonized fine cellulose, comprising:
    preparing a cellulose sample (S10);
    drying the cellulose sample (S20);
    carbonizing the dried cellulose sample, thus forming a carbonized cellulose (S30);
    mixing the carbonized cellulose with a fluid, thus obtaining a carbonized cellulose-mixed fluid (S40); and
    applying shock waves using ultrasonic waves and microbubbles to the carbonized cellulose-mixed fluid to pulverize the carbonized cellulose, thereby forming a carbonized nano-sized cellulose (S50).

2. The method of claim 1, further comprising loading a metal nano-catalyst on a surface of the carbonized nano-sized cellulose (S60).

3. The method of claim 1, further comprising inserting the carbonized nano-sized cellulose into microchannels in a carbonized cellulose fiber having a microchannel structure, thus forming a micro-nano catalyst support (S70); and
    loading a metal nano-catalyst on the micro-nano catalyst support (S80).

4. The method of claim 1, wherein the cellulose sample is selected from the group consisting of cotton, hemp, flax, jute, kenaf, henequen, *Setaria viridis*, acacia, pine, *Ceramium kondoi, laver, Gelidium amansii, Pterocladiella capillacea, Acanthopeltis* sp., *Gracilaria verrucosa, Hypnea charoides, Ceramium boydenii, Gigartina tenella, Campylaephora hypnaeoides, Grateloupia filicina*, wool, and silk.

5. The method of claim 1, wherein the drying the cellulose sample (S20) is performed using a lyophilization process.

6. The method of claim 1, wherein the forming the carbonized cellulose (S30) is performed through carbonization at a temperature ranging from 500 to 1500° C. in an inert gas atmosphere or is performed through primary carbonization at a temperature ranging from 500 to 700° C. in an inert gas atmosphere and secondary carbonization at a temperature ranging from 700 to 2000° C. in an inert gas atmosphere.

7. The method of claim 1, wherein the fluid comprises at least one selected from the group consisting of acetone, acetyl glycol, isopropyl alcohol, hexane, dichloromethane, ethanol, methanol, hexadecane, dodecane, dimethylsulfoxide, benzene, xylene, methyl chloride, chloroform, toluene, and dimethylformamide.

8. The method of claim 2, wherein the metal nano-catalyst is platinum, gold, silver, nickel, cobalt, ruthenium, palladium, or molybdenum.

\* \* \* \* \*